United States Patent [19]
Ward

[11] 4,154,566
[45] May 15, 1979

[54] STACK MOLD STABILIZER

[75] Inventor: George L. Ward, Manhattan Beach, Calif.

[73] Assignee: El Mar Plastics, Inc., Carson, Calif.

[21] Appl. No.: 810,720

[22] Filed: Jun. 28, 1977

[51] Int. Cl.$^2$ .............................................. B29C 1/16
[52] U.S. Cl. ................................ 425/451.3; 249/162; 425/338; 425/581
[58] Field of Search ............... 425/572, 588, 338, 581, 425/451.3, 234, 34 R; 249/162, 126

[56] References Cited

U.S. PATENT DOCUMENTS

| 829,380 | 8/1906 | Ball | 249/162 |
|---|---|---|---|
| 1,335,525 | 3/1920 | Patterson | 249/162 |
| 2,349,805 | 5/1944 | Tapper | 425/338 |
| 2,375,252 | 5/1945 | Sayre | 425/581 X |
| 2,596,602 | 5/1952 | Roddenbery, Jr. | 425/338 |
| 3,650,653 | 3/1972 | Erickson | 425/451.3 X |

Primary Examiner—William R. Briggs
Attorney, Agent, or Firm—Nilsson, Robbins, Daagarn, Berliner, Carson & Wurst

[57] ABSTRACT

A stack mold stabilizer for causing the multiple mold plates of a stack mold to maintain their required even spacing at all times during operation. The stabilizer includes a rack and pinion mechanism for maintaining an equal distance between the mold plates of the stack mold. The stack mold includes at least three mold plates with the mold plate at one end being fixed and having a first rack gear fixedly mounted to its side. The center mold plate has a pinion gear rotatably mounted thereon. The teeth of the pinion gear are maintained in firm meshing engagement with the teeth of the first rack gear by a first idler roller mounted on the center mold plate. The third mold plate has a second rack gear fixedly mounted to its side and has teeth which are kept in firm meshing engagement with the pinion gear by a second idler roller mounted on the center mold plate. The third mold plate is reciprocally driven by a suitable driving source and the rack and pinion gears maintain the distance between opposed faces of adjacent mold plates equal during the reciprocating movement to consistently seal at the parting line therebetween when the mold plates are in position to receive a charge of plastic material.

4 Claims, 3 Drawing Figures

STACK MOLD STABILIZER

BACKGROUND OF THE INVENTION

The present invention relates to a stack mold stabilizer and more particularly to a device for maintaining an equal distance between the mold plates in a stack mold.

Molds have long been used for injection molding plastic articles by bringing opposed faces of adjacent mold plates into abutting contact with each other. As is well known, opposed faces of adjacent mold plates define one or more cavities conforming to the desired product. When the opposed faces of adjacent mold plates are brought together, molten plastic is injected into the cavity through a conduit in one of the mold plates. The mold plates are cooled to cause the molten plastic to solidify to the desired shape. The mold plates are then separated and the finished plastic article is ejected. Closing and opening the mold plates to produce the finished plastic articles is performed on a continuously reciprocating basis.

It has been found that production of plastic articles can be substantially increased by arranging three or more mold plates in a stack mold and injecting the molten plastic into the cavities between opposed faces of adjacent mold plates. The mold plates are then separated to eject finished plastic articles from the mold. For a stack mold to operate properly, the mold plates must have equal spacing between them at all times.

Various prior art devices have been used in an attempt to maintain such equality. One example is the use of hydraulic actuator devices. A first hydraulic actuator is typically coupled between the fixed mold plate and the center mold plate of the stack. A second hydraulic actuator is coupled between the center mold plate and the driven mold plate. The hydraulic actuators are idling in the sense that no external fluid pressure source is applied to them.

As the driven mold plate is reciprocated by a suitable driving force, hydraulic fluid flows between the actuators to maintain the mold plates properly aligned. While such a system operates effectively when all parts thereof are functioning properly, difficulties have been experienced.

For example, such hydraulic actuator devices have been found to require a great deal of maintenance. The hydraulic seals leak thereby permitting air to enter the actuator system. This entry of air into the systems causes the center mold to become misaligned with respect to the opposed faces of the fixed mold plate and the driven mold plate. The driving source applies a very substantial pressure to the driven mold plate and if there is any misalignment between the mold plates, the hydraulic actuators may be damaged. Thus, the seals of the hydraulic actuators must be constantly replaced and hydraulic fluid must be constantly replenished in the cylinders. Bleeding air from the hydraulic actuators is constantly required even under the best of operational circumstances.

SUMMARY OF THE INVENTION

The present invention provides an injection mold stabilization apparatus which maintains the distance between opposed faces of adjacent mold plates equal. A rack and pinion mechanism is interconnected between the mold plates. As the mold is opened and closed in the normal molding operation, the rack and pinion mechanism functions to maintain proper spacing between the mold plates.

In accordance with a more specific feature of the present invention the rack and pinion mechanism includes a pinion gear and two rollers mounted on the center mold plate. Rack gears are secured to the driven and fixed mold plates and extend between the pinion gear and roller with teeth of the pinion gear meshing with teeth on the rack gears in exactly opposite diametric positions on the pinion gear.

BRIEF DESCPITION OF THE DRAWINGS

DESCRIPTION OF THE PREFERRED EMBODIMENT

The stack mold stabilizer system of the present invention includes a rack and pinion means which is interconnected between fixed, central and driven mold plates to maintain alignment thereof and the distance between opposed faces of the adjacent mold plates equal regardless of whether the mold plates are closed, open or in transition between the closed and open states. The equal distance between opposed faces of adjacent mold plates causes the mold plates to seal at the parting line when the stack mold is closed.

Figure 1:
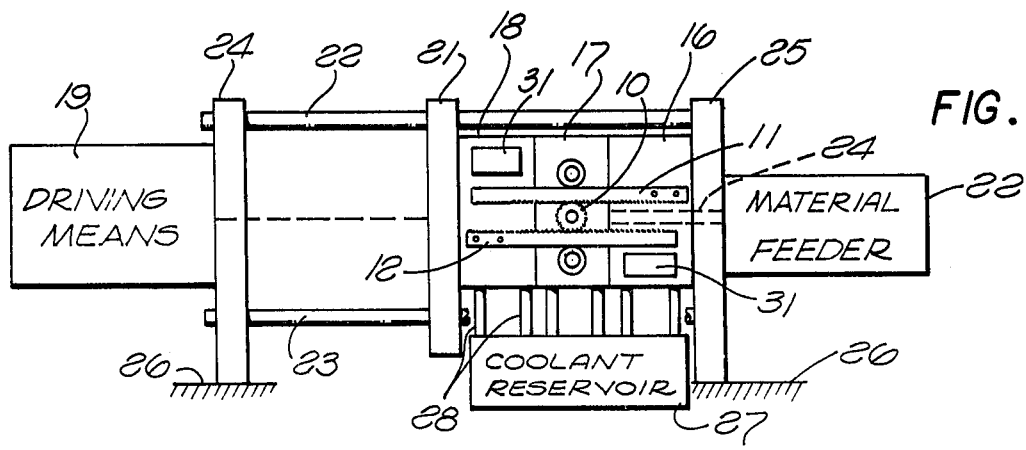
FIG. 1 is an elevational view in schematic form of an injection molding system having the present invention mounted thereon.

The rack and pinion means of the present invention includes a pinion gear 10 and rack gears 11 and 12. The rack gear 11 is fixedly secured to a first or fixed mold plate 16 and the pinion gear 10 is rotatably mounted on the side of a second mold plate 17 positioned in the center of the stack. The rack gear 12 is fixedly mounted to a third mold plate 18 which, as shown in FIG. 1, is driven by a suitable driving means 19. The driving means 19 may be of any type known to the art and may be electrically or hydraulically powered. One form of driving means includes a movable plate 21 affixed to the movable mold plate 18 and mounted upon rods 22, 23. The rods in turn are supported by plates 24-25 which are secured to a bed by the hash lines 26. As the driving means reciprocates the movable plate 21, the movable mold plate is reciprocated as required to provide reciprocating movement to open and close the stack mold.

Figure 2:
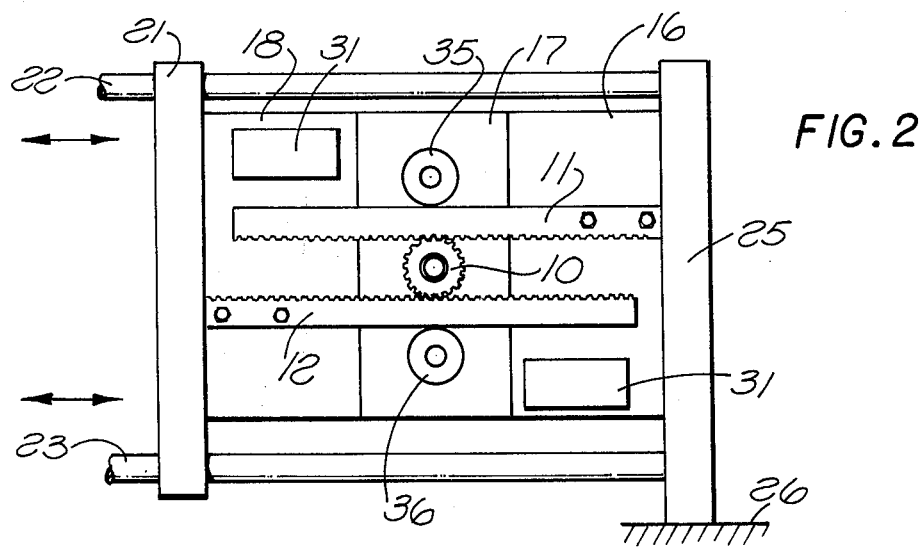
FIG. 2 is an elevational view in schematic form of the present invention on a stack mold.

The pinion gear 10 is rotatably affixed to the center mold 17 and is preferably centered on one side thereof. The rack gear 11 is mounted on the mold plate 16 with the teeth thereof meshing with the teeth of the pinion gear as shown more clearly in FIG. 2. Similarly, the rack gear 12 is fixedly attached to the mold plate 18 and also positioned so that the teeth thereof mesh with the pinion gear 10. It should be noted that the rack gears mesh with the pinion gear 10 at diametrically opposite points on the pinion gear 10.

A pair of idler rollers 35 and 36 are mounted on the side of the mold plate 17 in alignment with the pinion gear 10. The outer surface of the idler rollers 35 and 36 engage the rack gears 11 and 12, respectively, at a point opposite the point of contact with the pinion gear 10. The idler rollers retain the rack gear teeth in firm meshing contact with the pinion gear teeth at all times. It will thus be recognized that the spacing between the idler rollers and the pinion gear must be such as to just receive the rack gear and permit the movement thereof but not sufficient to permit loss of contact between the rack and pinion gears.

Figure 3:
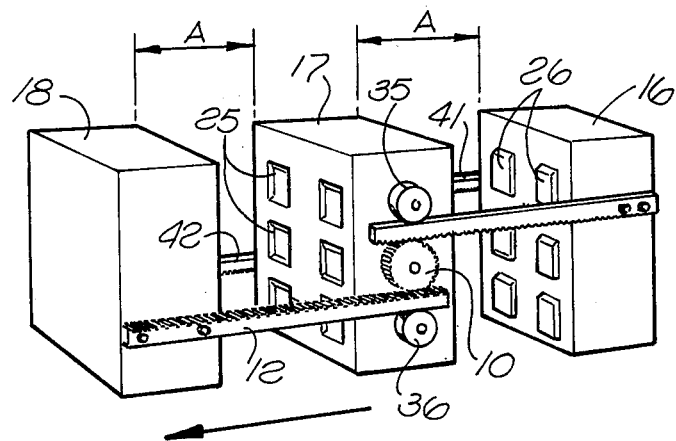
FIG. 3 is a perspective view of the stack mold shown in FIG. 2 but in its open position.

Thus, the present invention maintains the center mold plate 17 an equal distance, shown as dimension A in FIG. 3, between the fixed mold plate 16 and the driven mold plate 18 at all times. It thereby assures alignment of the mold plates 16, 17 and 18 with respect to each other.

In operational cycle of the injection molding machine, the hydraulic actuator 19 drives the mold plate 18 to close the stack mold. The forces thus applied are transmitted through the rack gear 12 to the pinion gear 10. As the mold plate 18 thus moves, the transmitted forces also cause the center mold plate 17 to move. It would appear that the single rack 12 and pinion 10 would function to provide the desired operation. Surprisingly such a structure was ineffective and did not operate properly. It has been discovered that by adding the additional rack 11 the unusual and unexpected result of stabilizing the mold plates was obtained. Therefore, through the use of the two rack gears 11 and 12 and the pinion gear 10, the present invention causes the mold plates 16, 17 and 18 to be stabilized at all times during the operation thereof.

The molten plastic which is to be shaped by the stack mold to the desired form is then fed under pressure by a material feeder 22 well known to those skilled in the art and through a suitable nozzle (not shown) into a conduit 24 extending through the stationary mold plate 16, through a network of conduits inside the mold plates to fill the cavities between opposed faces of the mold plates formed by the recesses 25 and protrusions 26 formed on opposed faces of the mold plates as is well known. The coolant reservoir 27 transmits a cooling fluid through conduits 28 to a honeycomb of internal conduits (not shown) within the mold plates 16, 17 and 18 to cool the molten plastic and cause it to solidify to the desired shape.

The driving means 19 then drives the mold 18 to open the mold plates as shown in FIG. 3. Thereafter an ejection apparatus 31 ejects the plastic articles from the cavities of the mold to fall into a suitable collection apparatus (not shown).

Many modifications and variations of the present invention are possible in light of the above teachings. Although the rack and pinion means is shown as one pinion gear 10 and two rack gears 11 and 12, a second rack and pinion construction may be arranged on the opposite side of the mold plates 16, 17 and 18 having rack gears 41 and 42 and a pinion gear (not shown).

Although the rack and pinion means is shown mounted on the side of the mold plates, they may be mounted on the top or bottom or through suitable bores inside the mold plates. It is therefore to be understood that the invention can be practiced otherwise than as specifically described.

I claim:

1. A stack mold stabilizer system for a reciprocating stack mold comprising:
    (A) a stack of three mold plates including
        1. a first mold plate at one end of said stack,
        2. a second mold plate in the center of said stack, and
        3. a third mold plate at the opposite end of said stack, opposed faces of each of said mold plates having mold cavities for molding plastic articles when said mold plates are in abutting contact with each other;
    (B) means for maintaining the distance between opposed faces of adjacent mold plates equal during reciprocation thereof including
        1. a pinion gear rotatably mounted on said second mold plate,
        2. a first rack gear fixedly mounted to said first mold plate and positioned to engage said pinion gear on one side thereof, and
        3. a second rack gear fixedly mounted to said third mold plate and positioned to engage said pinion gear on the opposite side thereof; and
    (C) drive means connected to said first mold plate to move said first mold plate and said first rack gear to open and close said stack mold;
    the distance between opposed faces of adjacent mold plates being maintained equal at all times during operation of said stack mold.

2. The system as described in claim 1 wherein said third mold plate is stationary.

3. The system as described in claim 2 further including first and second guide means engaging said first and second rack gears respectively, and opposite said pinion gear for maintaining said rack gears in first engagement with said pinion gear.

4. The system as described in claim 3 wherein said first and second guide means includes first and second idler rollers, respectively, rotatably mounted on said second mold plate in alignment with the axis of said pinion gear and the areas of contact between said rack gears and said pinion gear.

* * * * *